United States Patent [19]

Robinson

[11] Patent Number: 5,110,259

[45] Date of Patent: * May 5, 1992

[54] PITCH CHANGE BEARING SYSTEM

[75] Inventor: Madison K. Robinson, Bedford, Tex.

[73] Assignee: Bell Helicopter Textron Inc., Fort Worth, Tex.

[ * ] Notice: The portion of the term of this patent subsequent to Jan. 22, 2008 has been disclaimed.

[21] Appl. No.: 579,821

[22] Filed: Sep. 10, 1990

Related U.S. Application Data

[63] Continuation-in-part of Ser. No. 421,166, Oct. 13, 1989, Pat. No. 4,986,735.

[51] Int. Cl.⁵ ............................................. B64C 27/35
[52] U.S. Cl. ................................ 416/134 A; 416/141
[58] Field of Search ............. 416/134 R, 134 A, 140, 416/141, 244 R; 384/220, 221, 222

[56] References Cited

U.S. PATENT DOCUMENTS

| | | | |
|---|---|---|---|
| 3,231,222 | 1/1966 | Scheutzow | 416/134 A |
| 3,790,302 | 2/1974 | Pascher | 416/134 A |
| 3,829,239 | 8/1974 | Rybicki et al. | 416/141 |
| 4,427,340 | 1/1984 | Metzger et al. | 416/141 |
| 4,986,735 | 1/1991 | Robinson | 416/134 A |

Primary Examiner—Edward K. Look
Assistant Examiner—James A. Larson
Attorney, Agent, or Firm—Ross, Howison, Clapp & Korn

[57] ABSTRACT

A pitch change bearing assembly for a helicopter hub (10) having a yoke (14) and a grip (12) includes a shaft (24) having first and second ends (24a, 24b). A first radial elastomeric bearing (60) is disposed on the first end (24a) of the shaft (24). A second radial elastomeric bearing (62) is disposed on the second end (24b) of the shaft (24). The first and second radial elastomeric bearings (60, 62) are disposed parallel to one another. A third radial elastomeric bearing (66) is disposed on the shaft between and spaced apart from the first (60) and second (62) radial elastomeric bearings and is parallel to the first and second radial elastomeric bearings (60, 62). Structure (28, 30) is provided for attaching the third radial elastomeric bearing (66) to the grip (12). Structure (48, 50) is further provided for attaching the first and second radial elastomeric bearings (60, 62) to the yoke (14). The assembly allows for transmission of all applicable loads in a compact manner with significant compactness in the diametral direction due to the torsional motion sharing between bearing elements.

6 Claims, 2 Drawing Sheets

PITCH CHANGE BEARING SYSTEM

This invention was made with Government support under N00019-83-C-0166 awarded by Department of the Navy, Naval Air Systems Command. The Government has certain rights in this invention.

RELATED APPLICATION

This application is a continuation-in-part of U.S. application Ser. No. 07/421,166 filed Oct. 13, 1989 and entitled "Pitch Change Bearing System", U.S. Pat. No. 4,986,735.

TECHNICAL FIELD OF THE INVENTION

The present invention relates to a bearing assembly, and more particularly to a pitch change bearing assembly for a helicopter hub.

BACKGROUND OF THE INVENTION

In a helicopter hub assembly, it is necessary to interconnect the yoke to the hub. Such an interconnection is accomplished utilizing a pitch change bearing assembly to accommodate pitch change motions, blade shear reaction, and cocking motions between the non-feathering portion of the hub, the yoke, and the feathering portion of the hub, the grip. A critical factor in the design of pitch change bearing assemblies is the diametric size of the assembly. If large pitch ranges are required to be accommodated, large diameter bearings are required to handle the shear forces imposed by torsional motions which result in increased size requirements of the yoke and grip. It is therefore desirable that the pitch change bearing assembly have a relatively small diameter envelope to minimize the size of the yoke and grip.

A need has thus arisen for a pitch change bearing assembly for a helicopter hub, to provide pitch change motions, blade shear reactions and cocking motions in a minimum space envelope.

SUMMARY OF THE INVENTION

In accordance with the present invention, a pitch change bearing assembly for a helicopter hub having a yoke and a grip is provided. The bearing assembly includes a shaft having first and second ends. A first radial elastomeric bearing is disposed on the first end of the shaft. A second radial elastomeric bearing is disposed on the second end of the shaft. The first and second radial elastomeric bearings are disposed parallel to one another. A third radial elastomeric bearing is disposed on the shaft between and spaced apart from the first and second radial elastomeric bearings and is parallel to the first and second radial elastomeric bearings. Structure is provided for attaching the third radial elastomeric bearing to the grip. Structure is further provided for attaching the first and second radial elastomeric bearings to the yoke.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1:
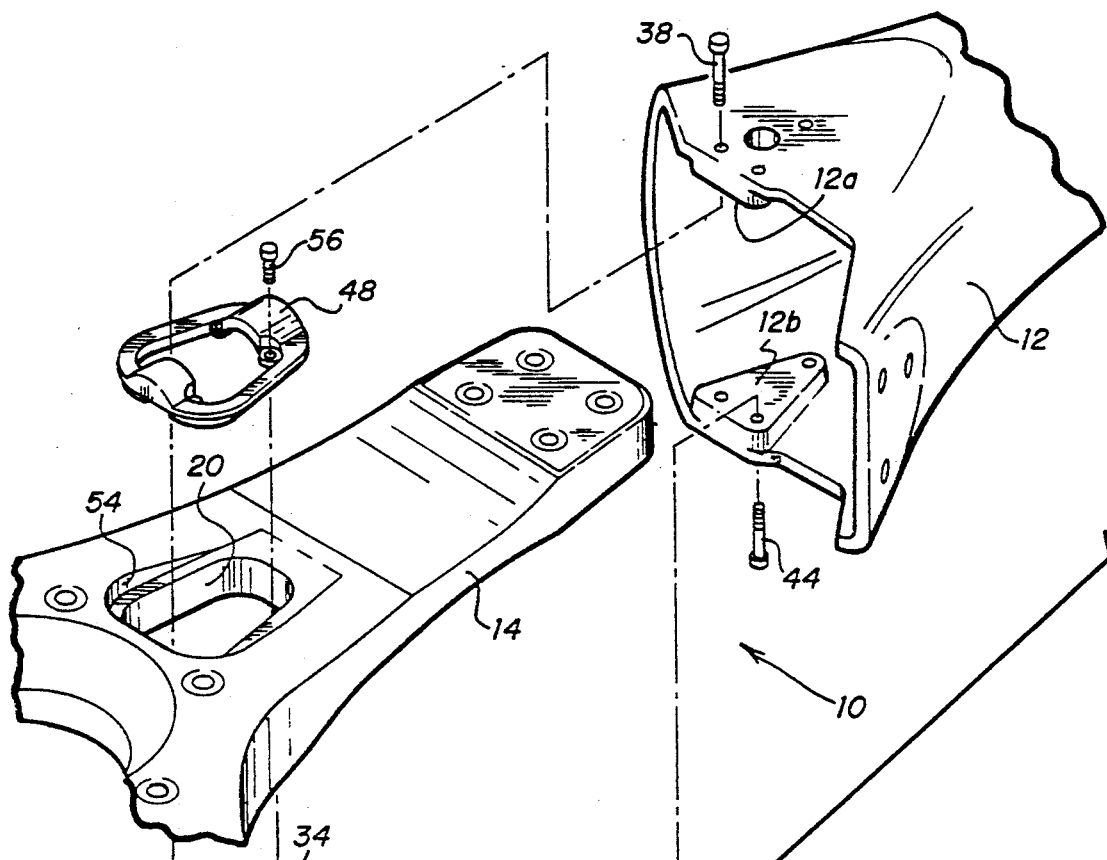
FIG. 1 is an exploded perspective view of a portion of a helicopter hub illustrating the present pitch change bearing assembly.

Referring to FIG. 1, an exploded perspective view of a portion of a helicopter hub is illustrated, and is generally identified by the numeral 10. The hub 10 includes a grip 12 and a yoke 14. The present pitch change bearing assembly is disposed between grip 12 and yoke 14, and is identified by the numeral 18. Pitch change bearing assembly 18 comprises an inboard assembly for interconnecting the inboard portion of yoke 14 to grip 12. The present pitch change bearing assembly 18 provides pitch change motions, blade shear reactions, and cocking motions in a minimal space envelope shown as an aperture 20 within yoke 14.

Pitch change bearing assembly 18 includes a shaft 24 on which are mounted a plurality of elastomeric bearing elements to be subsequently described with respect to FIG. 2. Shaft 24 is disposed between an upper housing member 28 and a lower housing member 30. Upper housing member 28 includes a mounting plate 34 for mating with an upper portion 12a of grip 12. Upper housing member 28 is attached to upper portion 12a of grip 12 using bolts 38. Lower housing member 30 includes a mounting plate 42 for mating with a lower portion 12b of grip 12, and is attached to lower portion 12b utilizing bolts 44. Alternatively, housing members 28 and 30 may be mounted to yoke 14, as illustrated in FIG. 3.

Further disposed circumferentially around shaft 24 is an upper bearing retainer 48 which mates with a lower bearing retainer 50. Upper bearing retainer 48 and lower bearing retainer 50 are disposed within aperture 20 of yoke 14 within a recess 54. Upper bearing retainer 48 and lower bearing retainer 50 once positioned within aperture 20 are interconnected utilizing bolts 56. Aperture 20 may have a diameter of, for example, four inches. Alternatively, retainers 48 and 50 may be mounted to grip 12, as illustrated in FIG. 3.

Figure 2:
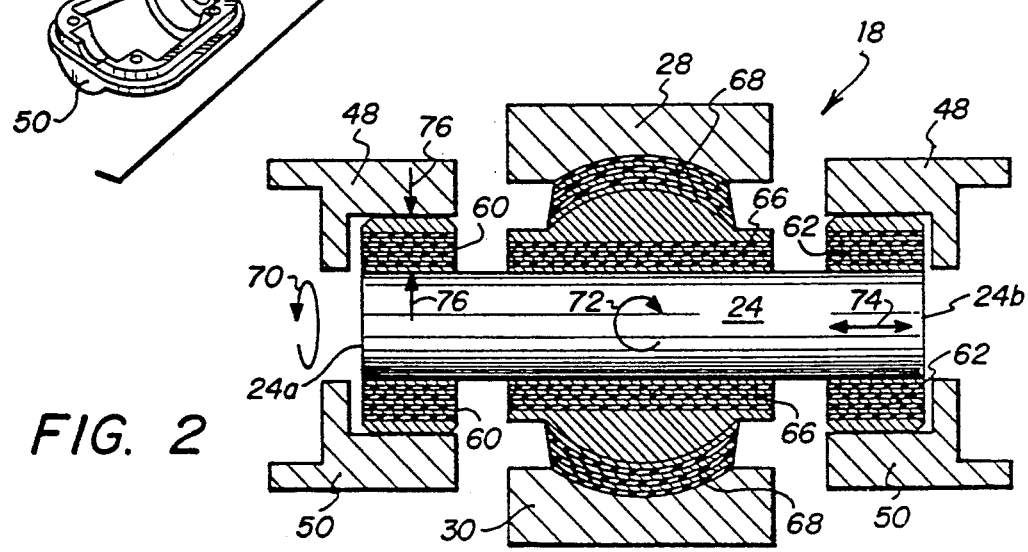
FIG. 2 is a cross-sectional view of the present pitch change bearing assembly shown in FIG. 1.
Figure 3:
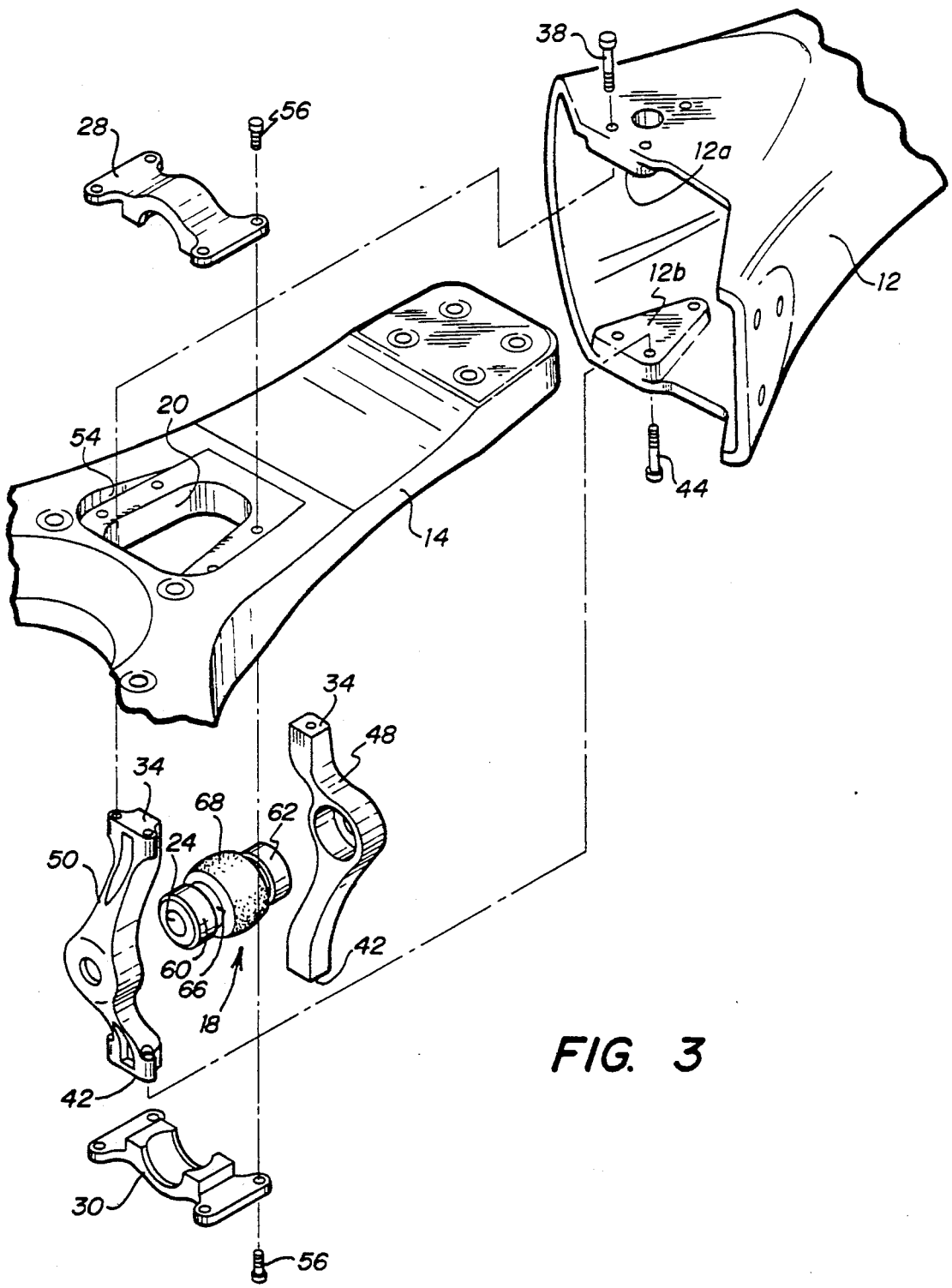
FIG. 3 is an exploded perspective view of a portion of a helicopter hub illustrating an alternate embodiment of the present pitch change bearing assembly.

Referring simultaneously to FIGS. 1 and 2, wherein like numerals are utilized for like and corresponding components identified with respect to FIG. 1, shaft 24 includes ends 24a and 24b. Mounted concentrically around end 24a of shaft 24 is a radial elastomeric bearing element 60. Radial elastomeric bearing element 60 engages upper bearing retainer 48 and lower bearing retainer 50. Disposed concentric on shaft 24 and at end 24b of shaft 24 is a second radial elastomeric bearing element 62 which is disposed parallel to radial elastomeric bearing element 60. Radial elastomeric bearing element 62 also engages upper bearing retainer 48 and lower bearing retainer 50.

Centrally disposed on shaft 24 and spaced apart from radial elastomeric bearing elements 60 and 62 is a third radial elastomeric bearing element 66. Radial elastomeric bearing elements 60, 62 and 66 are all disposed parallel to and rectilinear with respect to each other. Disposed concentrically around radial elastomeric bearing element 66 is a spherical elastomeric bearing element 68 which engages upper housing member 28 and lower housing member 30. Elastomeric bearing elements 60, 62, 66 and 68 are composed of a rubber component with distributed metallic transition shims as is well known to those skilled in the art.

In operation of the present pitch change bearing assembly 18, pitch change motions and blade shear reactions are shared between radial elastomeric bearing elements 60, 62 and 66 and spherical elastomeric bearing element 68. Radial elastomeric bearing elements 60, 62, and 66 and spherical elastomeric bearing element 68 share the torsional motions imparted by grip 12 and therefore make it possible to reduce the size of the envelope of the pitch change bearing assembly 18. Torsional motion on pitch change bearing assembly is illustrated by arrow 70. Cocking motion illustrated by arrow 72 is accommodated primarily by spherical elastomeric bearing element 68. Radial elastomeric bearing elements 60 and 62 translate torsional motion and a small amount of axial motion illustrated by arrow 74 between grip 12 and yoke 14. Radial elastomeric bearing elements 60 and 62 react to large radial forces indicated by arrows 76 and are soft in the torsional direction and axial direction. Spherical elastomeric bearing element 68 is soft in the cocking direction and soft in the torsional direction while being stiff in the radial plane. Radial elastomeric bearing element 66 is soft in the axial direction while both spherical elastomeric bearing element 68 and radial elastomeric bearing element 66 are stiff in the radial direction. Rotational motion of grip 12 is transferred to shaft 24 through spherical elastomeric bearing element 68 and radial elastomeric bearing element 66.

Therefore, it can be seen that the present invention provides for a pitch change bearing assembly having a relatively small envelope for accommodating pitch change motions, blade shear reactions and cocking motions between a helicopter hub grip and yoke. The assembly allows for transmission of all applicable loads in a compact manner with significant compactness in the diametral direction due to the torsional motion sharing between bearing elements.

Whereas the present invention has been described with respect to specific embodiments thereof, it will be understood that various changes and modifications will be suggested to one skilled in the art and it is intended to encompass such changes and modifications as fall within the scope of the appended claims.

I claim:

1. A pitch change bearing assembly for a helicopter having a yoke and a grip comprising:
   a shaft having first and second ends;
   a first radial elastomeric bearing element disposed on said first end of said shaft;
   a second radial elastomeric bearing element disposed on said second end of said shaft;
   a third radial elastomeric bearing element disposed on said shaft between and spaced apart from said first and second radial elastomeric bearing elements;
   means for attaching said third radial elastomeric bearing element to a grip; and
   means for attaching said first and second radial elastomeric bearing elements to a yoke, such that said third radial elastomeric bearing element and said first and second radial elastomeric bearing elements share torsional motions imparted by the grip, thereby allowing a reduced radial envelope of the pitch change bearing assembly in which torsional motions can be accommodated.

2. The pitch change bearing assembly of claim 1 wherein said first, second and third radial elastomeric bearing elements are disposed parallel to one another.

3. The pitch change bearing assembly of claim 1 wherein said third radial elastomeric bearing element is substantially twice as long as said first and said second radial elastomeric bearing elements and wherein said first and second radial elastomeric bearing elements are substantially of equal length.

4. A pitch change bearing assembly for a helicopter having a yoke and a grip comprising:
   a shaft having first and second ends;
   a first radial elastomeric bearing element disposed on said first end of said shaft;
   a second radial elastomeric bearing element disposed on said second end of said shaft;
   a third radial elastomeric bearing element disposed on said shaft between and spaced apart from said first and second radial elastomeric bearing elements;
   a spherical elastomeric bearing element disposed concentrically around said third elastomeric bearing element;
   means for attaching said third radial elastomeric bearing element to a yoke; and
   means for attaching said first and second radial elastomeric bearing elements to a grip, such that said third radial elastomeric bearing element and said first and second radial elastomeric bearing elements share torsional motions imparted by the grip, thereby allowing a reduced radial envelope of the pitch change bearing assembly in which torsional motions can be accommodated.

5. The pitch change bearing assembly of claim 4 wherein said first, second and third radial elastomeric bearing elements are disposed parallel to one another.

6. The pitch change bearing assembly of claim 5 wherein said third radial elastomeric bearing element is substantially twice as long as said first and said second radial elastomeric bearing elements and wherein said first and second radial elastomeric bearing elements are substantially of equal length.

* * * * *